Sept. 13, 1966  J. K. HALE  3,272,026
TENSION CONTROL DEVICE
Filed Oct. 14, 1964  2 Sheets-Sheet 2
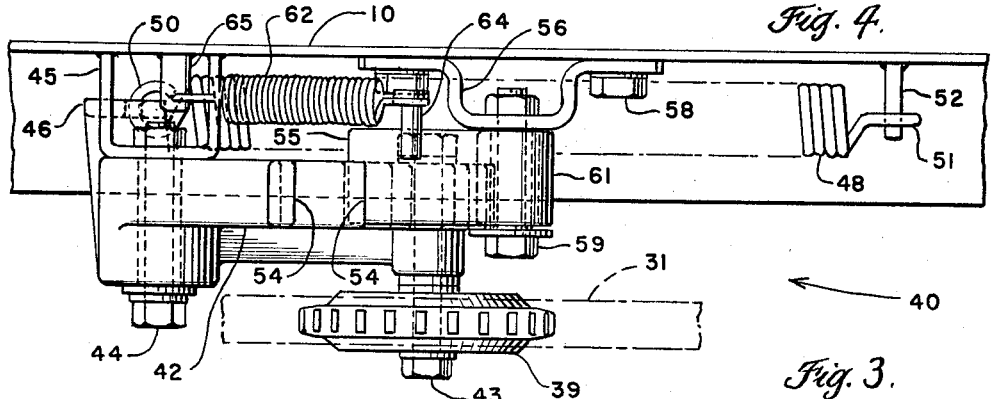
Fig. 4.
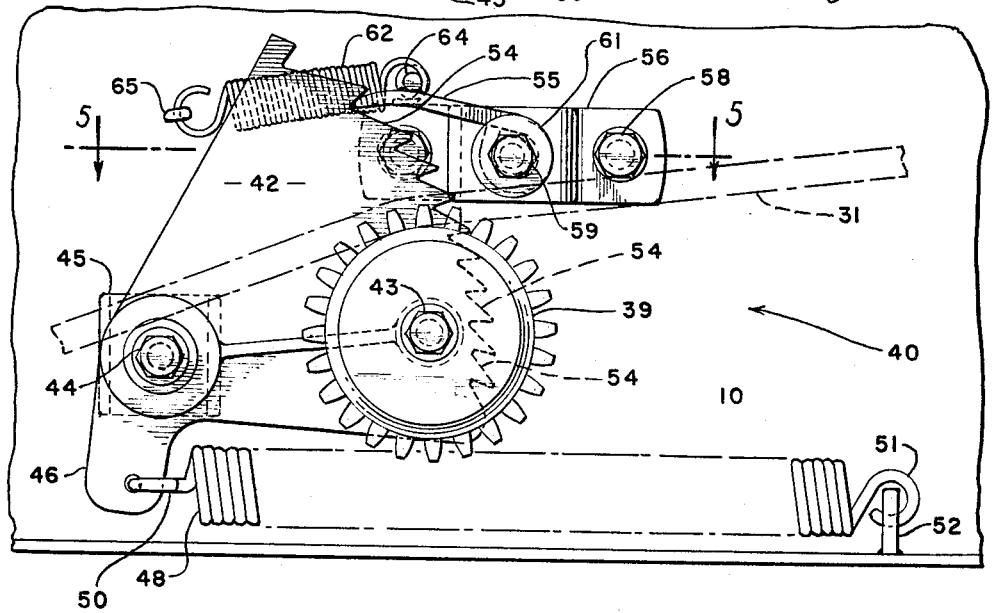
Fig. 3.
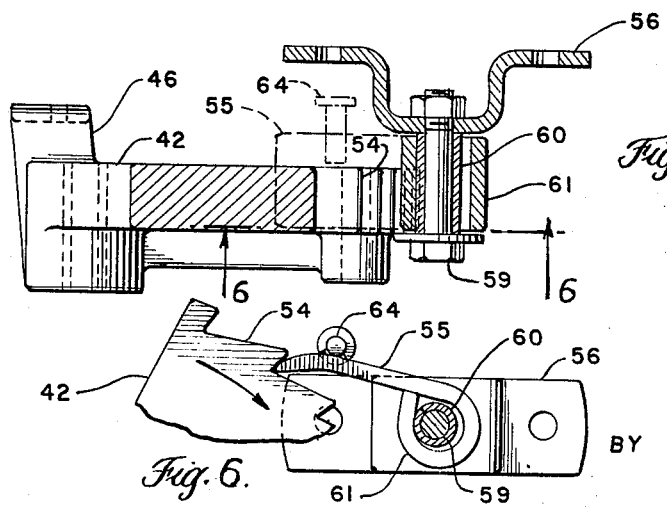
Fig. 5.
Fig. 6.
INVENTOR.
JOHN K. HALE
BY Walter V. Wright
AGENT

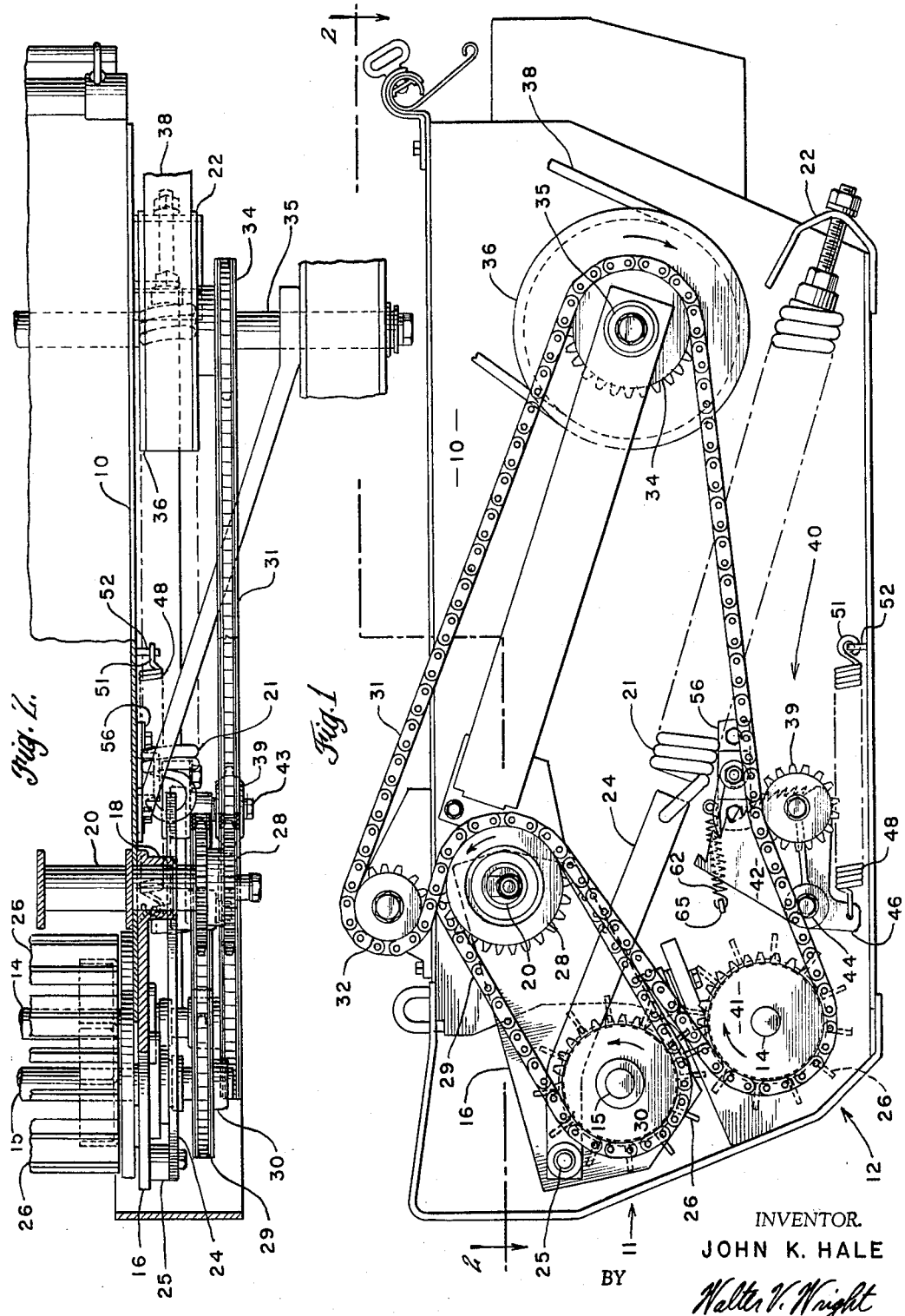

United States Patent Office 3,272,026
Patented Sept. 13, 1966

3,272,026
TENSION CONTROL DEVICE
John K. Hale, New Holland, Pa., assignor to Sperry Rand Corporation, New Holland, Pa., a corporation of Delaware
Filed Oct. 14, 1964, Ser. No. 403,856
2 Claims. (Cl. 74—242.11)

This invention relates to tension and slack control means for an endless driving member such as a chain or belt.

Endless chains are generally employed in preference to belts in drive trains wherein precise timing of driven members is required, or where it is otherwise desirable to avoid slippage in the drive train. It is desirable for such drive chains to be operated within certain limits of tension and slack. Excessive chain tension results in undue chain wear and stress on other elements of the drive train while excessive slack allows chain pounding and wear and may result in the chain climbing over the teeth of a sprocket thereby destroying the timing of the drive. Like belts, chains are subject to a certain amount of stretch in use as a result of normal wear, thereby adding to the difficulty of precise tension and slack control. These problems are amplified in the case of drives which are subject to outside shock or impact loads.

This invention will be described in connection with, and is primarily intended for use with, a drive chain. Should the degree of precise tension control afforded by the present invention be desired in a drive belt, however, the substitution of a pulley or roller for the sprocket of the present invention is considered to be within the scope of this invention.

It is the general object of this invention to provide means for controlling the tension of an endless drive chain.

It is another object of this invention to provide drive chain tension control means which prevents sprocket tooth climbing even under severe impact and shock load conditions.

It is another object of this invention to provide drive chain tension control means which increases chain life and substantially eliminates chain pounding even under the severest of loading conditions.

It is another object of this invention to provide chain tension control means which compensates for normal chain stretch without adjustment.

It is another object of this invention to provide chain tension control means which positively prevents the formation of excessive chain slack throughout the service life of the chain without adjustment and with the application of minimum loading force to the chain.

It is another object of this invention to provide chain tension control means which is rugged, mechanically simple and capable of manufacture at low cost.

These and other objects of this invention will be apparent upon reference to the following description and claims taken in conjunction with the accompanying drawings wherein:

FIG. 1 is a side elevational view of a crop conditioning attachment for a windrower showing a drive train equipped with drive chain tension control mechanism constructed in accordance with the principles of the present invention;

FIG. 2 is a fragmentary sectional view of the attachment shown in FIG. 1 looking downwardly on the drive train as indicated by the line 2—2 in FIG. 1;

FIG. 3 is an enlarged fragmentary side elevational view showing the drive chain tension control mechanism shown in FIG. 1;

FIG. 4 is a plan view of the structure shown in FIG. 3;

FIG. 5 is a sectional view taken on the line 5—5 of FIG. 3; and

FIG. 6 is a sectional view taken on the line 6—6 of FIG. 5.

Referring now to the drawings in detail, particularly to FIGS. 1 and 2, the reference numeral 10 refers to the side frame plate of a windrower crop conditioning attachment. The conditioner attachment includes upper and lower crop conditioning rolls 11 and 12, respectively. The shaft 14 of lower roll 12 has one end journalled in a fixed position on side frame member 10 and the other end identically journalled on a side frame member (not shown) on the other side of the machine. The shaft 15 of upper conditioning roll 11 is journalled on a plate 16 which is, in turn, journalled at 18 (FIG. 2) on a shaft 20 carried by side frame member 10. The other end (not shown) of upper conditioning roll 11 is identically mounted on the other side of the machine. In this manner, upper conditioner roll 11 is mounted for vertical swinging movement upwardly away from and back toward lower fixed conditioning roll 12 about the axis of shaft 20. A large coil spring 21, having one end anchored on a bracket 22 carried by side frame member 10 and the other end connected to a link 24 which is pivoted at 25 to plate 16, biases upper roller 11 downwardly into engagement with lower roll 12.

As is best seen in FIG. 1, the conditioning rolls 11 and 12 have peripheries comprised of longitudinally extending radial fins 26 which intermesh in the bite of the rolls when they are in their normal operating position as shown in FIG. 1. It is essential that the rolls 11 and 12 be driven in precise timed relation to each other in order to prevent clashing of the fins 26 of the respective rolls. A double sprocket member 28 is journalled on the previously mentioned shaft 20. A short endless chain 29 is entrained about one of the sprockets of double sprocket member 28 and about a sprocket 30 keyed to the shaft 15 of upper conditioning roll 11. A longer drive chain 31 is entrained around the other sprocket member of double sprocket 28 and then around the forward side of a small idler sprocket 32 fixedly journalled on conditioner side frame member 10 above double sprocket 28. Chain 31 extends rearwardly from sprocket 32 to a drive sprocket 34 keyed to a shaft 35 at the rear of the conditioner attachment. Shaft 35 is driven by a pulley 36 keyed thereto. The pulley 36 is driven by an endless belt 38, a portion of which is visible in FIGS. 1 and 2. Belt 38 extends upwardly and rearwardly from the conditioner attachment to a power-take-off sheave driven by the engine of a windrower on which the conditioning attachment is intended to be mounted. Endless chain 31 has a lower reach extending forwardly from drive sprocket 34 to and over the sprocket 39 of the tension control device 40 of this invention and on forwardly therefrom to sprocket 41 keyed to shaft 14 of lower conditioning roll 12. Chain 31 wraps about the forward side of sprocket 41 and extends rearwardly therefrom and upwardly to double sprocket member 28 to complete its circuitous path. The direction of rotation of the various rotary members shown in FIG. 1 are indicated by arrows thereon.

In operation, the conditioner rolls 11 and 12 receive crop material therebetween and pass it from left to right to crack the stems between the intermeshing fins 26. At any time, stones and other foreign objects may be picked up and carried between the rolls along with the crop material. This subjects the rolls and the drive train to rather severe impact loads which cause the drive chain to whip if slack is available. Upper roll 11 is free to raise about shaft 20 to allow the objects to pass through in opposition to spring 21. In some crop conditions, one or both of the conditioner rolls sometimes become wrapped with crop material. This increases the effective diameter of the wrapped roll and it attempts to drive the other conditioning roll, through peripheral contact, at a rate faster than that of drive chain 31. In conditions such as this, lower conditioner roll sprocket 41 attempts to draw slack from the reach of chain between sprocket 41 and sprocket 34 and feed the slack into the reach between sprocket 41 and double sprocket 28. If sufficient slack is available, the sprocket 28 may climb ahead one or more links of chain 31. This destroys the timed relationship of the drive and the fins 26 of the two conditioning rolls clash. The conditioner attachment shown and described herein is merely one example of a drive train environment requiring precise tension and slack control of a drive chain which is subject to severe loading conditions. The conditioner attachment is in no way considered to be a part of the present invention.

The chain tension control device 40 of the present invention is best seen in FIGS. 3 and 4. The shaft 43 of sprocket 39 is journalled on a plate-like member 42 disposed adjacent to, and parallel to the plane of operation of, chain 31. Member 42 is journalled on a pivot bolt 44 which is carried by a bracket 45 welded to conditioner side frame member 10. The axis of bolt 44 is parallel to sprocket shaft 43 and perpendicular to the plane of operation of chain 31. Thus, the plate 42 mounts sprocket 39 for swinging movement in the plane of drive chain 31 generally transverse to the path of travel of the chain. Plate 42 has a short depending arm 46 formed thereon to provide a bell crank-like sprocket mount. A coil spring 48 has one hooked end 50 thereof connected to the arm 46. The other end of spring 48 has a hook 51 anchored to a bracket 52 welded to side frame member 10. As viewed in FIG. 3, the spring 48 biases plate 42 in the counterclockwise direction about its pivot mounting bolt 44 thereby urging sprocket 39 upwardly into engagement with chain 31. A series of ratchet teeth 54 are formed in one edge of plate 42. A pawl 55 is pivotally mounted on a bracket 56 attached by bolts 58 to side frame member 10. As best seen in FIG. 3, pawl 55 engages teeth 54 to positively prevent clockwise movement of plate 42 and sprocket 39 about the pivot mounting bolt 44.

It will be apparent, particularly in FIG. 1, that upward, or counterclockwise, movement of pulley 39 about pivot bolt 44 by spring 48 in response to chain stretch, will increase the distance that any given link of chain 31 must travel to complete one revolution about the chain circuit. Each successive degree of angular displacement of sprocket 39 counterclockwise from the position shown in FIGS. 1 and 3, however, increases the total length of the chain circuit by a progressively greater amount. Consequently, the spacing between consecutive ratchet teeth 54 progressively diminishes from the first tooth at the top of plate 42 to the last tooth at the bottom of plate 42 so that the length of the chain circuit increases in equal amounts as each successive ratchet tooth 54 moves past pawl 55.

As best seen in FIGS. 5 and 6, the pivot mounting member for pawl 55 on bracket 56 is a bolt carrying a spacer sleeve, or bushing, 60. Pawl 55 has an enlarged loop portion 61 encircling bolt 59 and sleeve 60. The inside diameter of loop portion 61 is considerably larger than the outside diameter of sleeve 60 to allow pawl 55 to move a limited distance toward and away from ratchet teeth 54. A pawl biasing spring 62, best seen in FIGS. 3 and 4 has one end hooked over a pin 64 carried by the pawl. The other end of spring 62 is hooked in a pin 65 welded to side frame member 10. This spring holds pawl 55 in engagement with ratchet teeth 54 and also biases the pawl to the left as seen in FIGS. 3 and 4. The tension of spring 62, however, is considerably less than the normal tension of chain 31. Thus, when pawl 55 is in firm engagement with any one of the ratchet teeth 54, its loop portion 61 is in the position shown in FIGS. 5 and 6 relative to sleeve member 60. As soon as chain 31 experiences a little stretch, loading spring 48 will move plate 42 counterclockwise about pivot bolt 44 thereby moving the vertex of the ratchet tooth 54 out of engagement with pawl 55. Spring 62 then moves pawl 55 to the left as seen in FIGS. 3 and 4, in addition to holding the pawl downwardly in firm engagement with the upper surface of the ratchet tooth. When chain 31 has undergone a sufficient amount of stretch, main loading spring 48 will move plate 42 counterclockwise about bolt 44 to an extent where pawl 55 will drop into engagement with the next successive ratchet tooth 54. At this point there would be no available slack at all in chain 31 if it were not for the large loop 61 on pawl 55. As it is, the tension of chain 31 acting through sprocket 39, plate 42 and ratchet teeth 54 will overcome the limited tension of pawl biasing spring 62 and move pawl 55 to the right to the position shown in FIGS. 5 and 6 relative to sleeve 60. This movement of pawl 55 relative to sleeve 60 relieves the tension of chain 31 to provide the desired minimum amount of chain slack required for optimum operation and service life of the drive train. The mounting of pawl 55, in effect, enables the device 40 to take all the slack out of chain 31 and then feed back the proper amount of slack.

With this invention, main loading spring 48 may be lighter than conventional idler loading springs since it need only compensate for the normal stretch that develops in chain 31 and does not oppose impact or abnormal loads. Abnormal conditions and impact loads which momentarily increase the tension in chain 31 between sprockets 34 and 41 by an amount sufficient to overcome spring 48, or even a heavier spring, are positively prevented from drawing slack from the reach of chain between sprockets 34 and 41 by engagement of pawl 55 with ratchet teeth 54. This positively prevents the jumping of sprocket teeth and chain links without subjecting the drive train to the constant stress of a heavy idler loading spring. Another advantage of the tension control mechanism of this invention over conventional spring loader idlers is that with the conventional spring loaded idler, as the chain stretches and becomes longer and more likely to jump, the loading spring compresses and exerts less loading force on the chain thereby becoming less able to prevent jumping. Thus either the tension device becomes less effective, or it must be adjusted, or an excessively heavy loading spring must be initially employed. With the present invention, the loading spring is light and pawl 55 still positively prevents slack from being drawn from the reach of chain between sprockets 34 and 41. The total length of the series of ratchet teeth 54 exceeds the maximum amount of stretch that can develop in chain 31.

While this invention has been described in connection with a particular embodiment thereof, it will be understood that it is capable of modifications, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:

1. Mechanism for controlling slack and tension in an endless drive chain having a reach moving in a predetermined direction in a given plane, said mechanism comprising an idler sprocket disposed in said plane in meshing engagement with said chain reach, a plate-like member disposed adjacent said chain reach and lying in a plane parallel to said given plane, means journalling said plate-like member for pivotal movement about a fixed axis perpendicular to said given plane, means journalling said sprocket on said plate-like member for movement therewith generally transverse to the direction of travel of said chain reach, a spring connected to said plate-like member and urging said member in a given direction about said fixed axis to move said sprocket transversely of said chain reach and take up slack in the chain, a pawl member, means mounting said pawl member adjacent said plate-like member for pivotal movement about an axis parallel to said fixed axis and for limited to-and-fro movement toward and away from said plate-like member, a series of ratchet teeth formed in said plate-like member in position to move consecutively past said pawl member upon movement of said plate-like member in said given direction, the spacing between consecutive teeth in said series of ratchet teeth progressively diminishing from the first tooth to move past said pawl to the last tooth to move past said pawl, and spring means urging said pawl member into engagement with said ratchet teeth to prevent pivotal movement of said plate-like member about said fixed axis in a direction opposite said given direction beyond the limited extent of to-and-fro movement of said pawl member.

2. Mechanism for controlling slack and tension in an endless member as recited in claim 1 wherein said pawl member has a ratchet tooth engaging portion at one end thereof and a closed loop portion at the other end thereof, and wherein said means mounting said pawl member for pivotal movement and limited to-and-fro movement comprises a fixed pivot member extending through said loop portion of said pawl member, said pivot member having an outside diameter substantially less than at least one inside dimension of said loop portion of said pawl.

References Cited by the Examiner
UNITED STATES PATENTS

| | | | |
|---|---|---|---|
| 1,163,891 | 12/1915 | Caverno | 74—242.11 |
| 1,832,958 | 11/1931 | Bachle | 74—242.11 X |
| 1,852,768 | 4/1932 | Carden | 74—242.15 |
| 2,180,449 | 11/1939 | Wilson | 74—242.11 X |
| 2,664,757 | 1/1954 | Shaw | 74—242.15 X |

DAVID J. WILLIAMOWSKY, *Primary Examiner.*

J. A. WONG, *Assistant Examiner.*